(12) United States Patent
Nolan

(10) Patent No.: US 6,891,550 B1
(45) Date of Patent: May 10, 2005

(54) IMAGE MANIPULATION SOFTWARE

(76) Inventor: Paul Anthony John Nolan, 3687 Mount Ariane Dr., San Diego, CA (US) 92111

( * ) Notice: Subject to any disclaimer, the term of this patent is extended or adjusted under 35 U.S.C. 154(b) by 208 days.

(21) Appl. No.: 09/802,983

(22) Filed: Mar. 12, 2001

Related U.S. Application Data (60) Provisional application No. 60/188,281, filed on Mar. 10, 2000.

(51) Int. Cl.[7] ................................................ G09G 5/00
(52) U.S. Cl. ........................ 345/619; 345/581; 345/418
(58) Field of Search ................................ 345/639, 156, 345/594, 764, 441, 589, 619; 382/284

(56) References Cited

U.S. PATENT DOCUMENTS

| | | | | |
|---|---|---|---|---|
| 4,514,818 A | * | 4/1985 | Walker | 345/592 |
| 4,602,286 A | * | 7/1986 | Kellar et al. | 348/597 |
| 5,175,625 A | * | 12/1992 | Miles | 348/563 |
| 5,216,755 A | * | 6/1993 | Walker et al. | 345/591 |
| 5,412,767 A | * | 5/1995 | Long | 345/639 |
| 5,459,529 A | * | 10/1995 | Searby et al. | 348/586 |
| 5,767,860 A | * | 6/1998 | Zimmer et al. | 345/441 |
| 5,828,819 A | * | 10/1998 | Do et al. | 345/604 |
| 5,835,086 A | * | 11/1998 | Bradstreet et al. | 345/581 |
| 5,974,198 A | * | 10/1999 | Hamburg et al. | 382/284 |
| 5,999,190 A | * | 12/1999 | Sheasby et al. | 345/589 |
| 6,011,536 A | * | 1/2000 | Hertzmann et al. | 345/418 |
| 6,195,101 B1 | * | 2/2001 | Ghislain Bossut et al. | 345/629 |
| 6,201,549 B1 | * | 3/2001 | Bronskill | 345/441 |
| 6,239,807 B1 | * | 5/2001 | Bossut | 345/582 |
| 6,317,142 B1 | * | 11/2001 | Decoste et al. | 345/762 |
| 6,348,924 B1 | * | 2/2002 | Brinsmead | 345/441 |
| 6,417,853 B1 | * | 7/2002 | Squires et al. | 345/473 |
| 6,434,269 B1 | * | 8/2002 | Hamburg | 382/163 |
| 6,466,210 B1 | * | 10/2002 | Carlsen et al. | 345/629 |
| 6,486,886 B1 | * | 11/2002 | Silverbrook et al. | 345/584 |
| 6,512,855 B1 | * | 1/2003 | Delean | 382/276 |

\* cited by examiner

*Primary Examiner*—Michael Razavi
*Assistant Examiner*—Jin-Cheng Wang
(74) *Attorney, Agent, or Firm*—James Creighton Wray; Meera P. Narasimhan

(57) ABSTRACT

The invention is the basis of a computer graphics application that allows increased flexibility and creative freedom to the user. By keeping a hidden copy of the image being worked on, plus one or more special layers, the invention is able to offer the user the ability to erase past mistakes, directly apply image processing filters, and experiment with many different settings and options in a very quick and easy way.

14 Claims, 2 Drawing Sheets

IMAGE MANIPULATION SOFTWARE

This application claims the benefit of U.S. Provisional Application No. 60/188,281, filed Mar. 10, 2000.

BACKGROUND OF THE INVENTION

1. Field of the Invention

This invention relates to graphical image manipulation systems.

2. Description of Related Art

The closest prior art known to the inventor for this kind of image manipulation are the two US Patents: Hamburg, "Compound layers for composited image manipulation", U.S. Pat. No. 6,028,583, Issued Feb. 22, 2000, incorporated by reference in its entirety, and Hamburg, et al, "Adjustment layers for composited image manipulation", U.S. Pat. No. 5,974,198, Issued Oct. 26, 1999, incorporated by reference in its entirety.

In a typical graphics package, an image processing filter is applied either to the entire image, or a region selected by the user. If a region is to be used, it must be specified prior to the filter being applied. Once the filter has been applied, changing its options requires reverting to the unprocessed version of the image, and starting again. This makes trying out lots of filters very time consuming, resulting in the user being less inclined to try all of the options at his or her disposal.

To undo a mistake in a typical graphics package, the user must undo each stroke of paint applied, until the mistake is gone. If the mistake occurred in the first stroke of paint, every single stroke drawn afterwards must be removed in order to undo the mistake. A mistake could be corrected in a much easier way by selectively erasing portions of paint strokes.

Changing the color of strokes drawn by the user in a typical graphics package is difficult or impossible to do. If say the user draws a stroke using one shade of blue, they may wish to see what the stroke would look like if it had been drawn in a slightly different shade of blue, or even a completely different color. This would require reverting back to the state the image was in prior to the strokes being drawn, and the user would have to repeat the strokes they made using a different color. Even for a trivial amount of drawing, this is very challenging, for a more complex drawing, it becomes increasingly less feasible.

If the user wishes to apply a filter to a specific region of the image, they must first define it prior to applying the filter. This is typically done using a number of selection tools. Once a filter has been applied, if the user wishes to change the region it is applied to, they must undo the filter, change the region, and re-apply the filter. If the user were able to modify the region the filter is applied to after a filter had been applied, it would save a lot of time and make things much easier and quicker.

To change the applied image processing filter in a typical graphics package requires the applied filter to be undone (i.e. the image is reverted back to a state prior to the filter being applied), and a new filter applied. A good graphics package may have more than fifty such filters, which results in a prohibitive amount of work involved on the part of the user if they wanted to see what each filter looked like.

To change the options a filter offers to the user, such as the strength or radius of the filter, in a typical graphics package requires the filter to be undone and re-applied as above. The ability to modify a filters options after it has been applied to the image would allow the user a much greater ability to tweak the result to their taste.

Limitations of Adjustment Layers, as used in Photoshop version 5.0, have been observed.

U.S. Pat. No. 5,974,198 to Adobe states "A key property that sets these functions apart from filters (such as blurring operations), is that each pixel in the result only depends on the spatially corresponding pixel in the source image". For each pixel in the source image, an adjustment function is applied. This adjustment function can only read the one pixel given to it when computing the resulting pixel. This is called a one-to-one mapping. The reason adjustment layers can only use one-to-one mappings is that at the time of processing, only the value of the one pixel currently being processed is actually known. Take for example the situation where the bottom most layer is blurring the image (which is a complex, or many to one mapping), and the topmost adjustment needs to read a pixel from a random co-ordinate. The correct value for this pixel is not stored anywhere, as it is an intermediate value. The correct value is that of the unprocessed image after it has been processed by all the adjustment layers beneath the one currently being processed. If the filter were to read from the unprocessed image, it would result in the ignoring of the bottom adjustment layer's effect. If it were to read from the fully processed image, it would create feedback is as it would be reading values that had already been processed by the same function. When processing the entire image, this problem can be resolved by processing each layer at a time in its entirety. So starting from the unprocessed image, a new image is created from the result of the first adjustment layer. A new image is then created from the result of this new image processed by the next adjustment layer, and so on, until each adjustment layer has been processed. This requires at least three copies of the image to be stored simultaneously. The problem is that the entire image must be processed in this way, even if a smaller region needs to be processed, say as a result of the user drawing a stroke of paint. Unless the intermediate images are kept (at the cost of a large amount of system resources), an adjustment filter reading from anything other than the current pixel being processed is still not guaranteed to read in the correctly processed value.

The easy solution to this is for the adjustment filter to simply not read from anything other than the current pixel being processed, which is the approach taken by U.S. Pat. No. 5,974,198.

Needs exist for improved image manipulation in creating images.

SUMMARY OF THE INVENTION

When you draw something using the current invention, you don't have to worry about making mistakes. Whilst you can use the multi-level undo and redo if you aren't happy with what you have done, one of the core distinguishing features of the current invention is that you can rub out any drawing mistake you just made with the right mouse button. With the current invention, the left mouse button applies paint (which includes what other packages call filters), and right mouse button removes it. This even works with smudge and smear; it is an incredibly productive way of working. Imagine you just spent a lot of time drawing the outline of a picture. You look at it and realise that the first stroke you drew could have been a little bit better. In most other packages, you'd have to undo all the bits you were happy with just to get to the bit you wanted to change. This is very inefficient, with the current invention, just rub out your mistake as easily as you made them, and redo it until you are happy.

Now what if after you perfect the outline of your masterpiece, you decide it would have looked better drawn in a different color? Well, unless you are using an application based on the current invention, you might just have to start over from scratch. Instead, imagine a toggle button that lets you change what you had just drawn. Imagine you had an "Experiment Mode" that made changing the color of what you just did as easy as clicking on a palette. It would allow you to experiment and perfect your work to a degree never before possible.

Now let's take some typical chores and compare how you would complete it first using a typical application, and then with the current invention.

A common task is to process a region of an image. In this case, let's say we want to liven up the background of an image. We aren't using the current invention, so we must first define the area we want to process. Typically this involves creating a selection that outlines or masks off what should be processed and what should be left behind. There's are several ways of making such as masks, such as using the magic wand and other selection tools. Once you've figured out how to do this (which often takes several minutes or more), you can finally apply the desired image-processing filter. So, select the filter of your choice. You should now have a requester in front of you with all of the filter's options. If you are very lucky, you'll have a small preview so you can see roughly what the filter will do. So, press the OK button or equivalent to apply the filter and get out of the filter requester. Now, the result might look OK, but could use a little tweaking. The area selected wasn't quite perfect, and could do with more work. So, undo the filter effect, and alter the selection. Bring up the options for applying the filter again, maybe tweak the options to get more of the desired effect, and re-apply. Undo it, tweak the mask, change the settings, reapply the filter.

Now, the following is how you would achieve the same result using the current invention. First, select the Paint Mode (another term for an image-processing filter) you want to use. Next, spray the airbrush over the area you want processed.

If you over-spray the region you wanted, just erase the bits you don't want using the right mouse button. Once you have got used to being able to do this, there really is no going back.

To change the default settings for the filter/paint mode, select the Mode Options tab in the Options window on the left (or by default it is automatically brought to the front when you select a paint mode that has options). Note that this isn't a requester, displaying it doesn't restrict you to only adjusting those settings. These options are always available, you can adjust the settings, spray a bit more with the airbrush, adjust the settings again and so on, all without having to undo and reapply the filter or open and close requestors ad infinitum like in most packages. When you click on a slider for example, the image is immediately updated to reflect the changes. If you have a slower machine (less than 50 mhz), or are using a very CPU intensive effect, every single mode has a preview icon above its options to show what the results will look like before the main image begins to be processed. For most modes though, changing its options results in the image being updated in real time. Note that all processing is applied on a separate thread, so you never have to abort an effect or wait for it to finish before proceeding. Changing one of the options while the image is being processed simply aborts the current processing and restarts it with the new options, while you are still dragging the slider! You can even carry on painting while the image is being processed.

That was the simplest way of applying an effect to a region. You could also have selected the region in the traditional way using selection/magic wand tools. Instead of getting an outline displaying the region though, you would get the effect apply immediately. If a mode/filter is too slow to be applied instantly, you can start with Paint Mode or Negative to get the region right, then switch to the mode you desire, and what you had previously drawn can be redrawn with the new mode.

You could also use an alpha channel to mask off the area of interest. You could load a ready made one from disk (maybe your 3D rendering package generated it for you), or start from scratch with a new image. An alpha channel basically changes how much of an effect shows through, based on the brightness of each pixel in the alpha image. So a black alpha image with a white circle in the middle would result in only a circle being processed in the main image. For maximum flexibility, each layer can have its own alpha channel, and by using a color image as the alpha channel, each red, green, and blue channel can have its own mask. So if you drew a red circle on the alpha image instead of a white one, only the red channel of the main image would be processed. Also rather neat is the fact that painting on or processing the alpha image results in the main image being updated in real time. So if the alpha channel's edges were too sharp, you could simply spray a blur over the alpha channel, and the area being applied to the main image will redrawn with smoother edges.

If you just want to apply a filter to the entire image, press the "Fill Layer" button on the toolbar. The "Clear Layer" button removes all of what you have just drawn from the image.

Of course, that's just a few ways in which the current invention allows you to easily achieve the results you desire. If needed, you can also fade out everything you do with the transparency slider, or move it around with the position tool. And lets not forget that if you don't like the effect you choose, turn on Experiment Mode and simply select another one and what was drawn in the old mode will be redrawn in the new one.

Prior Implementation

The inventor released his first implementation of a graphical manipulation system in 1994. This version could produce several of the results of the current invention, but had many limitations that the present invention overcomes. For both versions, the user's action of drawing with a pointing device results in values being added to a special type of alpha channel image, termed a Paint Layer. Version 1 then worked as follows. For each source pixel in the image, an image processing function was called to generate a processed pixel. The source and the processed pixel were then combined via the value of the alpha channel for that pixel. The higher the value of the alpha channel, the more the result is biased towards the processed pixel, with an alpha value of 0 resulting in the source pixel being displayed, and a value of 255 (i.e. full brightness) resulting in the processed pixel being displayed. This end value was then displayed (after further processing if needed in order to meet the limitations of display hardware of that era) to the user, and discarded to save memory. Memory in 1994 was much more expensive back than today, a typical machine might only have had 2 or 4 megabytes (I had a luxurious 6 megabytes of RAM). Since 1994, memory has dropped in price by a huge factor, resulting in base systems shipping with 32 to 128 megabytes of memory. Although discarding the processed image saved memory, it had other disadvantages. If the image needed to be redrawn, or stored to disk, each pixel had to be processed in order to generate the same result as was displayed to the user.

Because the amount of so called "paint" applied to the image was stored independently of the image in the form of a paint layer, this allowed several interesting features. The color of what the user had painted on for example could be changed, and the image recomputed with this new color and redisplayed to the user. The result is that the user is then able to draw something using one color, and then modify that color after the drawing had already taken place. By the same principle, the image processing filter in place could be changed for a different filter, allowing the user to see what the image would look like if they had painted using the new filter to begin with.

Another disadvantage of the approach taken by Photogenics 1.0 is that it did not act like a typical graphics package. In most systems, if you want to draw a stroke of red paint, then draw a stroke of green paint, you would select red, draw a stroke, select green, and draw another stroke. If you did the same thing in Photogenics 1.0, changing the color to green would have had no effect. In order to start painting with a new color or image processing filter, the user had to perform a "fix", which resulted in Photogenics 1.0 processing the image, and instead of discarding the results, they would be remembered and copied back to the main image. This could take up to several minutes if the filter was a very complex one. Having to press fix every time the user wanted to paint with a new color or filter was time consuming and distracting.

Photogenics 1.0 was unable to have more than one paint layer per image due to the difficulty of implementing this.

The invention allows the user to apply all filters directly to the image, just by painting them on (in addition to their application to the entire image). A typical package allows colored paint to be painted on to the image, the invention allows any image processing filter, including paint, one-to-one, many-to-one, and many-to-one mappings to be applied in the same way.

This invention allows the user to selectively erase mistakes in the same way paint is applied. As implemented in this invention, the left mouse button applies paint to the image, and the right mouse button removes it. The left/right mouse buttons are the most natural combination, however the other input devices such as graphics tablets, light pens, qualifier keys and so on could also be used with the same result.

The invention allows information about multiple layers upon a graphics image to be stored as one byte or other representation (such as a word or floating point value) per pixel, as opposed to four bytes or other representation per pixel as many graphics packages currently do.

The invention makes it possible for the user to change the color of what they have previously drawn by allowing the user to simply select a new color, and have all of the strokes drawn in the current color re-processed in the new color and displayed almost immediately to the user.

The invention makes it possible for the user to select a different filter and have the applied effect reprocessed with the new filter and displayed almost immediately to the user.

The invention makes it possible for the user to change a filter's options after the filter has been applied, and see the results almost immediately.

The invention offers the user two modes of working, one where selecting a new color or paint mode results in what the has been previously drawn being recalculated and redisplayed using the new attribute, and one where changing the color or paint mode has no visible effect, but internally prepares the image to receive a new amount of paint.

In a previous invention, in 1994, if you had drawn something in red, and wanted to draw something else in green, you couldn't immediately do so as the changes you made in red had to be "Fixed" or applied to the image by processing them, and copying the results back to the primary image. Photogenics 1 had to be manually told by the user when to perform a Fix. Whilst flexible, it wasn't very conducive to fast and efficient workflow. A good way of solving this problem is by having an "Experiment Mode" toggle button on the toolbar. With Experiment mode turned off, the software behaves like a standard paint package, i.e. changing the color doesn't affect what's on screen, that color is simply used next time you paint something. With Experiment mode turned on, changing the color or image processing effect changes what you have drawn immediately to reflect your wishes. So if you drew something in red, then selected blue, the red drawing would turn blue, almost instantly. This allows a lot of freedom to experiment that nothing else I have seen offers.

The fact that there are two copies of the image available also lets me do something I haven't seen done elsewhere, namely rubbing out a smudge or smear operation with the right mouse button.

As explained in the background of the invention, so called adjustment layers can only modify a source image by applying simple one-to-one mapping. I use the term "Paint Layers" to refer to the type of layer I have invented, and they are not limited in this regard. Every single filter available can be used to affect the image below the paint layer, even filters that map many input pixels to one output pixel. The solution is that if a paint mode wishes to read outside the current region being processed, it must first call a function to ask permission to do so. This function then has the ability to provide the paint mode with a properly processed version of the region in question in any way it sees fit. A properly processed version of the region is defined as the unprocessed image after it has been processed by every paint layer below the one being processed. If the system has the resources to store every intermediate value created in the processing of multiple paint layers, then the function can use these values, but in the more typical situation where there simply isn't room for all the intermediate values, the function can process the requested region with each paint layer below the one currently being processed.

Terms Used

Pixel—Pixel stands for Picture Element. It is the smallest addressable unit of an image.

Image—A collection of pixels.

Primary Image—The image viewed by the user.

Undo Image A copy of the primary image in a state prior to being processed

Paint Layer—An image used to keep track of where the user has painted, that is attached to the Primary image. Each paint layer also has other information associated with it, such as the current color, transparency, and paint mode function.

Media—A representation of the tool that the user paints with, for example an airbrush, watercolor brush, pencil, chalk, fire, lensflare, or neon.

Figure 4:
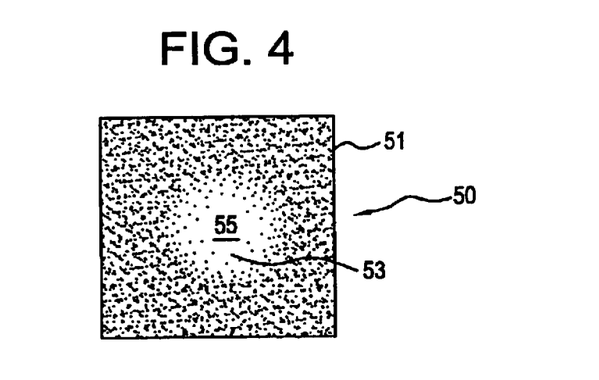
FIG. 4 shows a manipulated image.

Media Image—A user selectable and modifiable image representing the currently selected media, an example of which is shown in FIG. 4. Note that this image need not reside in storage, it can be represented algorithmically and calculated on the fly during the paint process.

Paint—What the user observes as something that they have done to modify an image.

Paint Mode—A user selectable image processing function (filter) of any complexity.

Alpha Channel—An image used to mask another image. Each pixel in the alpha channel represents the transparency of the spatially corresponding pixel(s) of the Image it is attached to. The brighter a pixel is in the Alpha Channel, the more the equivalent pixels in the Image it is attached to shows through to the image below it. Conversely, if a pixel in the alpha channel is dark (i.e. has a value of close to zero), then a correspondingly less percentage of the equivalent pixel in the image will be visible.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
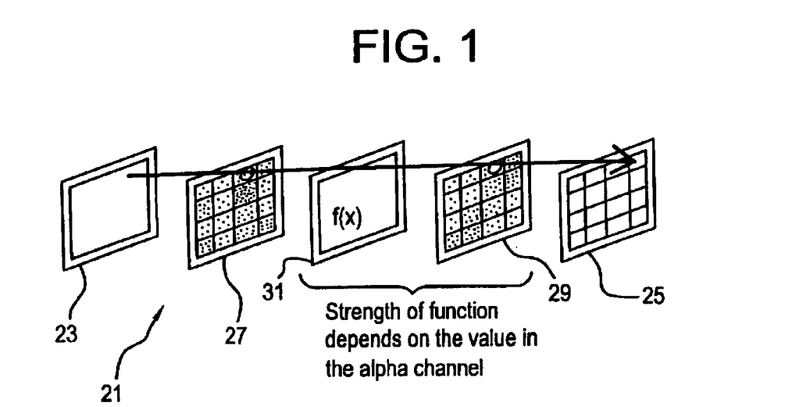
FIG. 1 schematically shows a processor, a secondary buffer, a function, an alpha channel and a primary buffer.

As shown schematically in FIG. 1, a graphics program 21 uses a processor 23.

Figure 2:
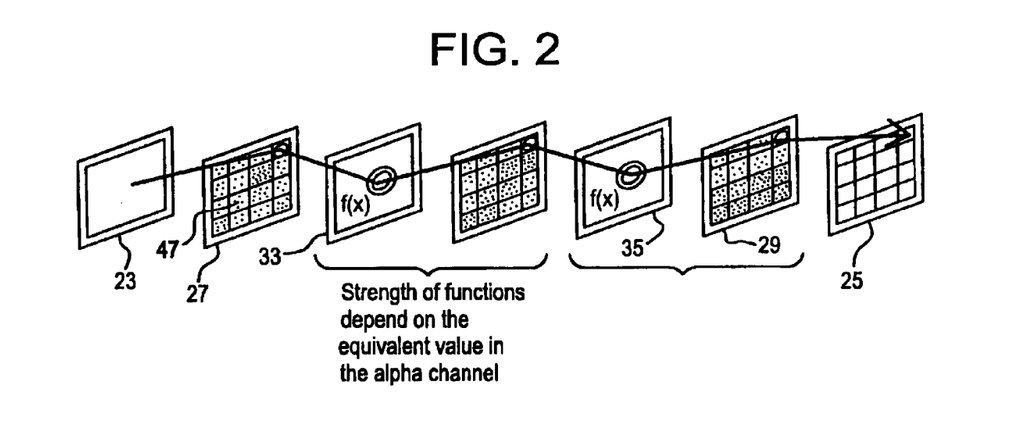
FIG. 2 schematically shows a processor, a secondary buffer, a first function, a first alpha channel, a second function, a second alpha channel and a primary buffer.
Figure 3:
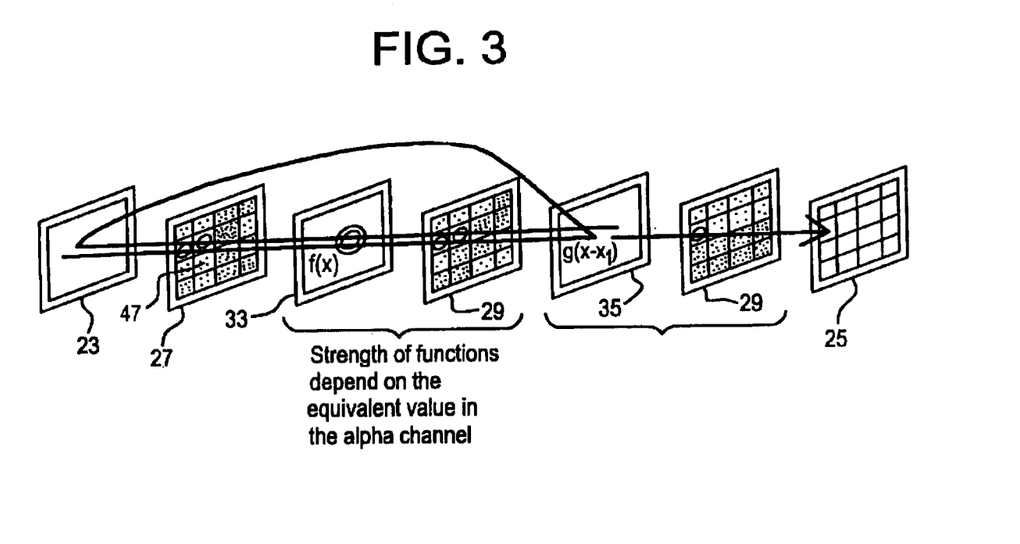
FIG. 3 schematically shows a processor, a secondary buffer, a first function, a first alpha channel, a second function, a second alpha channel and a primary buffer.

A first buffer 25 stores values representing manipulated pixels of a region in an image. A second buffer 27 stores values representing pixels of a region. A function 31 or a plurality of functions 33, 35, as shown in FIGS. 2 and 3, map input pixel values 30, 32 to output pixel values, 34 36. Input means 41 selects a function 31, 33, 35 with which pixels 43, 45 of the region are to be processed. Input means describe the strength and area of an alpha channel 29 in the region.

Processor 23 computes a new set 47 of pixel values.

The processor has means for calculating an output for each pixel with the selected function applied to it, and means for comparing the output pixels with the pixel values of the second buffer, according to the alpha channel described, to produce a set of resultant pixel values. The processor also has means for installing the resultant pixel values into the first buffer. An input means requests that the pixel values be copied from the first buffer to the second, and means are provided for copying the pixel values of said first buffer into said second buffer.

The plurality of functions include functions for directly mapping a pixel with an output in the same spatial orientation. The input means for selecting a function includes input means for selecting a sequence of functions. The input means for describing an alpha channel includes means for describing an alpha channel for each function. The processor processes the functions in described sequences, and stores the resultant pixel values of the final processed function in the first buffer.

The plurality of functions include complex functions for mapping input pixels with outputs of any spatial orientation. The processor computes values for pixels other than the ones whose values will be output, of up to the previous function in the sequence, when the function under process requires the input values of pixels of the region other than the input pixels spatially oriented with the output pixels.

The processor further comprises the means to compute or access a cached copy containing all of the pixel values of the region as processed up to the previous function when processing a complex function.

The processor processes each of the pixels with each of the filters in sequence and, when a filter function comprises a non-spatially orientated mapping, computes the values of the relevant other pixels, according to the function sequence, up to the previous function.

The graphics method includes storing values representing the pixels of a region in a first buffer, storing values representing the pixels of a region in a second buffer, mapping input pixel values to output pixel values with a plurality of functions, selecting a function with which pixels of the region are to be processed using input means, and describing the strength and area of an alpha channel in the region using input means.

The method includes computing a new set of pixel values with a processor, calculating an output for each pixel with the selected function applied to it, comparing the output pixels with the pixel values of the second buffer, according to the alpha channel for producing a set of resultant pixel values, installing the resultant pixel values into the first buffer, requesting that the pixel values be copied from the first buffer to the second, and copying the pixel values of said first buffer into said second buffer.

The invention is the basis of a computer graphics application that allows increased flexibility and creative freedom to the user. By keeping a hidden copy of the image being worked on, plus one or more special layers, the invention is able to offer the user the ability to erase past mistakes, directly apply image processing filters, and experiment with many different settings and options in a very quick and easy way.

Paint Layer Notes

How to visualize a Paint Layer: Normally if you had a painting, and applied more paint to it, it would be very hard to remove said paint. Now think of a painted picture with a sheet of glass placed over it. If you now paint on the image, the paint actually builds up on the glass, although it looks as if the paint has been applied to the image itself. If you apply too much paint, it can be selectively removed from the glass, revealing the painting below. A Paint Layer works on a similar principle, it sits on top of an image, and records how much Paint has been applied.

A paint layer is based on an alpha channel. An alpha channel can be used to mix two images, A and B (although neither image need be an array of pixels, each pixel could be generated algorithmically on demand). Each pixel in an alpha channel represents the transparency used to mix the equivalent pixels in image A and B. In this invention, image A would be the UndoImage, and the combined resulting image is stored in the Primary Image. Image B represents the UndoImage after being processed by a given filter. With a paint layer, image B can be replaced by a PaintModeFunction, which calculates what any given pixel in the Undo Image becomes after a filter is applied. On its own, a paint layer is invisible. Combined in the manner described, it results in the UndoImage being processed by a filter only in the region where the user has specified.

What the User Sees

When the user paints on the primary image, they see it change according to the media image selected, and the paint mode selected. For example, if the media image 50 were a circular gradient fill that progressed from black 51 on the outermost rings, to white 53 in the center 55, as shown in FIG. 4, and the paint mode designated "Paint" were selected, this would result in colored paint being applied to the image, mimicking the way an airbrush applies ink to a canvas. If for example an "Emboss" paint mode were selected, it would look as if an airbrush was causing the image to become embossed (in real time).

Setup

To begin, an Image is created. It can be created in many ways, such as by loading data from storage, by creating it algorithmically, by acquiring data from a scanning device, and so on. This first image becomes the Primary Image.

The undo image is initialized by copying the contents of the primary image to it. The paint layer is initialized by clearing all values to zero.

Painting

When the user requests that paint be applied to the image (typically by pressing the left mouse button over the image, or pressing with an attached drawing pen), the media image is added to the paint layer at the requested position. When the user requests that paint be removed from the image (typically by pressing the right mouse button, or the eraser end of an attached drawing pen), the media image is subtracted from the paint layer. If using integers to represent individual image elements, the values that occur during the adding and subtracting should be clipped so that over and underflow does not occur. The paint layer can also be modified in many other ways just like any other image, for example it can be cleared, set to a specified color, blurred, and so on.

Paint Modes

If a certain paint mode works by examining pixels other than those in the region passed to it, it must first request that these pixels be locked before it can read them. This gives the software the opportunity to process the pixels before the paint mode sees them. This is crucial when more than one paint layer is attached to an image. Take the following situation for example, where a primary image has two paint layers attached, with the bottom most paint layer using a blur paint mode, and the topmost layer using an emboss paint mode. If the emboss mode were given a rectangle 10 pixels wide by 1 pixel high to process, given an emboss radius of 1 pixel, it would have to look at a region 12 pixels wide by 3 pixels high in order to compute the emboss. If the emboss mode were to read these values from the 4 primary image, negative feedback would occur because the emboss would repeatedly emboss a region that had already been embossed, which is not the desired effect. If the emboss mode were to read values from the undo image, the emboss would not know about the blur that had previously been applied by the paint layer below it. The function called by the paint modes to lock the requested region is able to process any paint modes below the current paint layer. This lock function is optionally also able to take advantage of any cached versions of the undo image that already have been processed by paint modes on layers below the one currently being processed.

It is possible for more than one paint mode to be associated with a single paint layer. Any number of paint modes could be associated with a single paint layer. For example, one paint layer could have both a "blur" paint mode and a "sharpen" paint mode associated with it. The result would be that undo image would first be blurred, then the blurred version of the undo image would be sharpened. This is the same result as if two paint layers were involved, the bottom paint layer having blur selected, and the top layer having sharpen selected, but removes the need for the resources of two paint layers.

Processing

Whenever the paint layer is modified, the primary image is re-processed.

The paint mode function is called. This function processes the undo image, and puts its results in a temporary image (which in some situations can be the primary image). This processing can be as simple as setting the temporary image to a specified color (which gives the impression of colored paint being applied), a simple one-to-one mapping (for example increasing the brightness of the undo image), or complex (for example blurring the undo image). This temporary image is then alpha blended with the undo image, using the paint layer as the alpha values. The result is stored in the Primary Image.

A simplified psuedocode version of this is as follows:

Brief Guide to Pseudo Code

```
Something( )
{
}
```

The above code represents a function, named in this case Something.

A function typically performs a process, often calling other functions in order to do so. A function can be given arguments, such as Something(a,b). If a function is declared as Something(a,b), and another piece of code calls Something(1,2), once inside the Something function, a is assigned to 1, and b is assigned to 2. a and b are limited in scope to the Something value, that is to say, another function cannot read the values of these variables, they are termed local. A variable can be global, if it is declared outside of any function.

for(x=0 to Width) means repeat the section of code between the {and} for x2–0 times. Having two for loops nested in this way has the effect of assigning x and y to every co-ordinate in the image, and calling the code inside the { } Width*Height times.

PrimaryImage(x,y)=ProcessPixelBelowLayer (Image, TopMostPaintLayer, x,y) x=y is an assignment, i.e. x becomes the value of y. So PrimaryImage(100,100)=1 sets the value of the pixel at co-ordinate 100,100 to a value of 1. The right hand side of the assignment calls a function, which results in PrimaryImage(x,y) becoming the return value from the ProcessPixelBelowLayer function.

Pseudo Code to Process the Image

```
/* This function processes the specified region of the Image,
   and is called whenever a Paint Layer is modified */
ProcessImage (x1, y1, x2, y2)
{
/* Iterate through every pixel in the region defined by
   (x1,y1) to (x2,y2) *
for(y=y1 to y2)
for(x=x1 to x2)
{
/* Set the pixel at x,y in the PrimaryImage to the value
   returned by the ProcessPixelBelowLayer function */
PrimaryImage(x,y)=ProcessPixelBelowLayer(Image,
   TopMostPaintLayer, x,y);
}
}
}
ProcessPixelBelowLayer(Image,TopPaintLayerToProcess,
   x,y)
```

```
{
/* Assign the value of the pixel in the UndoImage at
   coordinates (x,y) to an intermediate variable */
This Pixel=Undomage (x,y)
/* Iterate through every paint layer attached to the image,
   from bottom to top */
for (PaintLayer=BottomMostPaintLayer to
   TopPaintLayerToProcess)
{
A=This Pixel
/* Note that the PaintModeFunction is typically specified
   individually for each layer, so that each layer may have
   a different Paint Mode, or even multiple paint modes
   per paint layer */
B=PaintModeFunction(Image,PaintLayer,x,y)
/* Each Paint Layer can have a global transparency value
   allowing the entire layer to be faded in and out. */
Trans=PaintLayer(x,y)* PaintLayerTransparency
/* Each Paint Layer can have one or more Alpha Channel
   Images attached, which acts as a mask */
{
if(PaintLayerHasAlpha)
{
Trans=Trans*PaintLayerAlpha(x,y)
}
This Pixel=AlphaBlend(A,B,Trans)
}
return This Pixel
}
AlphaBlend(A,B,Trans)
{
return A*(1-Trans)+B*Trans
}
/* This particular PaintModeFunction performs a very
   simple emboss filter */
PaintModeFunction(Image,PaintLayer,x,y)
{
if (ImageLock=LockImageBelowLayer (Image,
   PaintLayer, x-1, y-1,x+1,y+1)
{
EmbossedPixel=0.5+ImageLock(x-1,y-1)-ImageLock
   (x+1,y+1)
UnLockImageBelowLayer (ImageLock)
return EmbossedPixel
}
LockImageBelowLayer(Image,PaintLayer,x1,y1,x2,y2)
{
/* If the PaintLayer argument passed is the
   BottomMostLayer, this must mean that we are being
   asked to return what the UndoImage would look like
   before the BottomMostLayer has been processed,
   which is exactly what the UndoImage represents. */
if(PaintLayer==BottomMostLayer)
{
return UndoImage;
} else
{
/* Create a temporary image to store the pixels being
   requested */
TempImage=CreateNewImage;( )
/* Set each pixel in the temporary image to the value of
   equivalent pixel in the UndoImage after it has been
   processed by every paint layer below the one passed to
   this function */
}
```

In a production quality implementation, the above process is optimized by processing the image in a series of rectangles. The PaintModeFunction( ) is given a temporary buffer to write the results of processing a given rectangle, this removes the overhead of calling a function for every pixel.

Note the above pseudo code makes use of a primary buffer, which was not present in Photogenics 1.0. Thus claim 1.

Display

The primary image is then redisplayed to the user.

Fixing

In order for the user to be able to move on to applying a different color or Paint Mode, the Primary Image needs to be copied to the Undo Image, and the Paint Layer cleared. This action is referred to as a "Fix", as in "the paint is fixed in place".

AutoRedo

To allow the user to visualize how what they have painted would look like in a different color or paint mode, the software can be configured to automatically reprocess the image when the user changes the color of filter involved.

```
for(y=y1 to y2)
   for(x=x1 to x2)
   {
   TempImage(x,y)=ProcessPixelBelowLayer(Image,
      PaintLayer,x,y)
   }
}
return TempImage;
}
}
UnLockImageBelowLayer (ImageLock)
{
if(PaintLayer is not the BottomMostLayer)
{
DisposeImage (ImageLock)
}
```

AutoFix

To allow the user to paint with different colors or paint modes as easily as possible, the software can be configured to perform an automatic Fix operation. For example, if the user draws something with red selected as the current color, then selects green as the current color, a Fix can be automatically performed as soon as the user draws something using the green color. Typically the Fix is performed the moment the user clicks a mouse button or equivalent over the image, but always before the green paint is actually applied. The result is that the user paints with the new color as would normally be expected in a graphics package. The above automatic fix also applies if a new Paint Mode is selected.

Experiment Mode

Because a Paint Layer stores the amount of Paint applied to the Primary Image, changing an attribute such as the color of the Paint, or the Paint Mode in use is possible. Instead of automatically fixing as above, an option can be given for the image to be automatically re-processed. This is very useful as it allows the user to try out different things very easily. For example, the user could select every Paint Mode available in turn, and the software is able to recalculate what the Primary Image would look like with the new Paint Mode applied. The same goes for the color used, the transparency, and the position of the Paint Layer.

Conclusions, Ramifications, and Scope

Multiple and or nested Layers. A primary image can have as many paint layers attached as system resources will allow. Typically a linked list is used, though an array or many other methods would also work.

As well as having paint layers attached, an image can have Image layers attached. An image layer is just a standard Image (that can have one or more paint layers attached) with an alpha channel to store how much of the image layer should show through to the image below, attached to the Primary Image. This allows nesting of images.

A paint layer can be represented by a single channel image, or it can be represented by a multi-channel image. An example of this would be a paint layer that tracked how much paint was applied to the red, green, and blue channels of an image independently.

Each paint layer may have one of more alpha channels attached. The spatially equivalent pixel in the attached alpha is subtracted from each pixel in the paint layer. As the subtraction is done during the processing stage, the actual paint layer pixel values are unaffected. This means an alpha channel can be in place when the media image is added to the paint layer, yet the full amount of paint added is stored, as the effect of the alpha channel is computed later in the process. This means an alpha channel can be attached to a paint layer, more paint can be applied, and the alpha channel can then be removed, and the user is able to see exactly what the paint layer would look like as if the attached alpha channel had never existed.

Pixels in an Alpha channel or paint layer reflect the transparency of a spatially equivalent pixel in another image. The spatial representation can be modified, for example so that a pixel at co-ordinates (10,10) in an alpha channel or paint layer can represent the transparency of a pixel in another image at coordinates (15,15). This allows the user to move the paint layer around the image, effectively re-positioning what they had already painted.

The attached pseudo code for processing the image processes one pixel at a time. A faster way of doing this is to process the image one line at a time, or one region at a time. This lessens the system overhead incurred in calling any function.

When a fix is performed, and the primary image copied to the undo image, and the paint layer cleared, the user is then no longer able to modify the paint that has been fixed into the image. One solution is to create a copy of the changes between the primary image and the undo image, and to create a copy of the paint layer, just before the fix is applied. This allows the option of undoing the fix, and allowing the user to edit the fixed paint. The storage requirements of these copies, known as undo images, can be reduced by standard compression techniques, and by only storing the pixels that change between the primary image and the undo image. The undo images can be recycled every time a fix is performed, or a multitude of undo images can be stored. The more undo images, the further back the user can undo. One way of preventing the undo images from consuming all of the storage resources available is to creative create a list or other representation of multiple undo images, where a new undo image causes the oldest undo image to be discarded in favor of the newer undo image. When undo images can be of variable sizes due to compression, a set limit of the amount of storage to set aside for the undo image can be defined, and a variable number of older undo images can be discarded in favor of newer undo images.

In addition to storing how much paint the user applied to an image, it is also possible to store vectors representing each stroke and action the user makes when applying paint and other actions. This allows even more possibilities, as if a description of everything the user does is stored, the final image can be recreated from the image it was based on very easily by re-playing the stored description of everything the user did to create the final image. The description can also be modified, for example allowing the user to change the first thing they did, even if they have caused the image and paint layers to be fixed multiple times since. The description of an action requires considerably less storage requirements than the region based result of these actions, so that in effect, an unlimited undo is available that uses much less storage resources than even a small amount of region based undos.

The undo image method and the action description method of allowing the user to undo their actions described above can be combined. Undo images can be used if they are available to quickly revert back to the desired image state, and if an undo image is not available (for example if the user requests to undo an action that was performed so long ago that it has been flushed from the list of undo images), the alternative method of rebuilding an image from the beginning can be used.

The invention need not be implemented in software, a hardware implementation is also possible.

I claim:

1. A graphics program, comprising:
    (a) a first buffer for storing values representing the pixels of a region,
    (b) a second buffer for storing values representing the pixels of a region,
    (c) a plurality of functions for mapping input pixel values to output pixel values,
    (d) input means for selecting a function with which pixels of the region are to be processed,
    (e) input means for describing the strength and area of an alpha channel in the region,
    (f) a processor for computing a new set of pixel values, comprising:
        (1) means for calculating an output for each pixel with the selected function applied to it,
        (2) means for comparing the output pixels with the pixel values of the second buffer, according to the alpha channel described, to produce a set of resultant pixel values, and
        (3) means for installing the resultant pixel values into the first buffer, and
    (g) input means for requesting that the pixel values be copied from the first buffer to the second, and
    (h) means for copying the pixel values of said first buffer into said second buffer.

2. The graphics program of claim 1, wherein said plurality of functions include functions for directly mapping a pixel with an output in the same spatial orientation, wherein said input means for selecting a function further comprises input means for selecting a sequence of functions, wherein said input means for describing an alpha channel further comprises means for describing an alpha channel for each function, and wherein said processor for computing further comprises processing the functions in described sequence, and for storing the resultant pixel values of the final processed function in said first buffer.

3. The graphics program of claim 1, wherein said plurality of functions including complex functions for mapping input pixels with outputs of any spatial orientation, wherein said input means for selecting a function further comprises input means for selecting a sequence of functions, and wherein said input means for describing an alpha channel further comprises means for describing an alpha channel for each function.

4. The graphics program of claim 3, wherein said processor further comprises means to compute values for pixels other than the ones whose values will be output, of up to the previous function in the sequence, when the function under process requires the input values of pixels of the region other than the input pixels spatially oriented with the output pixels.

5. The graphics program of claim 3, wherein said processor further comprises the means to compute or access a cached copy containing all of the pixel values of the region as processed up to the previous function when processing a complex function.

6. The graphics program of claim 3, wherein the sequence of functions further comprises filters, wherein said processor for computing includes a processor for processing each of the pixels with each of the filters in sequence, and for, when a filter function comprises a non-spatially orientated mapping, computing the values of the relevant other pixels, according to the function sequence, up to the previous function.

7. The graphics program of claim 3, further comprising a function for determining the values of relevant pixels as they would be output by the previous function, connected to said complex function, for enabling said complex function to compute said complex function.

8. A graphics method, comprising:

(a) storing values representing the pixels of a region in a first buffer, (b) storing values representing the pixels of a region in a second buffer, (c) mapping input pixel values to output pixel values with a plurality of functions, (d) selecting a function with which pixels of the region are to be processed using input means, (e) describing the strength and area of an alpha channel in the region using input means, (f) computing a new set of pixel values with a processor, (g) calculating an output for each pixel with the selected function applied to it, (h) comparing the output pixels with the pixel values of the second buffer, according to the alpha channel for producing a set of resultant pixel values, (i) installing the resultant pixel values into the first buffer, (j) requesting that the pixel values be copied from the first buffer to the second, and (k) copying the pixel values of said first buffer into said second buffer.

9. The graphics method of claim 8, wherein said plurality of functions include functions for directly mapping a pixel with an output in the same spatial orientation, wherein said selecting a function further comprises selecting a sequence of functions, and wherein said describing an alpha channel further comprises describing an alpha channel for each function, and wherein said computing comprises processing the functions in described sequence, and storing resultant pixel values of a final processed function in said first buffer.

10. The graphics program of claim 8, wherein said plurality of functions including complex functions for mapping input pixels with outputs of any spatial orientation, wherein said selecting a function further comprises selecting a sequence of functions, and wherein said describing an alpha channel further comprises describing an alpha channel for each function.

11. The graphics method of claim 10, further comprises computing values for pixels other than the ones whose values will be output, of up to the previous function in the sequence, when a function under process requires the input values of pixels of the region other than the input pixels spatially oriented with the output pixels.

12. The graphics method of claim 11, wherein said computing further comprises the means to compute or access a cached copy containing all of the pixel values of the region as processed up to the previous function when processing a complex function.

13. The graphics method of claim 10, further comprising processing each of the pixels with each of several filter functions in sequence, and for, when a filter function comprises a non-spatially orientated mapping, computing the values of the relevant other pixels, according to the function sequence, up to the previous function.

14. The graphics method of claim 13, wherein said computing further comprises the means to compute or access a cached copy containing all of the pixel values of the region as processed up to the previous function when processing a complex function.

* * * * *